United States Patent [19]

Le-Khac et al.

[11] Patent Number: 4,522,983

[45] Date of Patent: Jun. 11, 1985

[54] POLYMERIC MOLDING COMPOSITION

[75] Inventors: Bi Le-Khac, West Chester, Pa.; Clyde Sharik, Plainsboro, N.J.

[73] Assignee: Atlantic Richfield Company, Los Angeles, Calif.

[21] Appl. No.: 473,835

[22] Filed: Mar. 9, 1983

[51] Int. Cl.³ .................................. C08F 279/02
[52] U.S. Cl. ................................ 525/285; 525/314; 525/316
[58] Field of Search .................................. 525/285

[56] References Cited

U.S. PATENT DOCUMENTS

| | | | |
|---|---|---|---|
| 2,802,809 | 8/1957 | Haver | 525/74 |
| 3,010,936 | 11/1961 | Irvin | 260/45.5 |
| 3,919,354 | 11/1975 | Moore et al. | 525/285 |
| 4,262,096 | 4/1981 | Lee et al. | 525/285 |
| 4,306,049 | 12/1981 | Prapas | 526/347 |
| 4,336,354 | 6/1982 | Lordi et al. | 525/285 |

Primary Examiner—Carman J. Seccuro
Attorney, Agent, or Firm—Dennis M. Kozak

[57] ABSTRACT

Polymeric composition having good impact resistance which comprises styrene, methylstyrene, a conjugated diene monomer, and optionally an unsaturated dicarboxylic acid anhydride, are described.

8 Claims, No Drawings

POLYMERIC MOLDING COMPOSITION

This invention relates to polymeric molding compositions having good impact strength.

In one of its more specific aspects, this invention pertains to impact resistant molding compositions which comprise styrene, methylstyrene, a conjugated diene monomer, and optionally an unsaturated dicarboxylic acid ahydride, and to a process for preparing them.

The polymeric molding compositions of this invention are prepared by polymerizing styrene, methylstyrene, optionally with an unsaturated dicarboxylic acid anhydride, in the presence of a preformed rubbery polymer composed of a conjugated diene monomer.

It is well known that polymeric molding compositions composed of styrene homopolymers and copolymers of styrene with unsaturated dicarboxylic acid anhydrides have poor impact strength. Improving the impact strength of such polymers, by the incorporation of preformed rubbery polymers is also generally known. The rubbery polymer is typically incorporated by blending or, preferably by polymerizing the monomers in the presence of the rubbery polymers. Although the incorporation of rubbery polymer serves to improve the impact strength of these molding compositions, the molding industry continues to search for other ways to make these molding compositions even more impact resistant.

Quite surprisingly, it has now been found that the incorporation of minor amounts of methylstyrene serves to enhance the impact strength of molding compositions comprising styrene, a rubbery polymer, and optionally an unsaturated dicarboxylic acid anhydride.

According to this invention there is provided a polymeric molding composition resulting from the polymerization of 100 parts by weight of (A) from about 55 to about 99.8% by weight styrene, (B) from about 0.2 to about 5% or more by weight of at least one isomer of methylstyrene selected from the group consisting of para-methylstyrene, ortho-methylstyrene and meta-methylstyrene, (C) from 0 to about 40% by weight of an unsaturated dicarboxylic acid anhydride, wherein the percentages of (A), (B) and (C) are based on the total combined weight of (A) plus (B) plus (C), in the presence of from about 1 to about 40 total parts by weight of at least one preformed rubbery polymer for each 100 parts of combined (A) plus (B) plus (C).

More specifically, the present invention provides a rubber-modified styrene-unsaturated dicarboxylic acid anhydride/methylstyrene terpolymer. A rubber-modified styrene-methylstyrene copolymer is also provided. Preferably, the unsaturated dicarboxylic acid anhydride, if employed, is maleic anhydride and the methylstyrene is substantially para-methylstyrene.

Also according to this invention, there is provided a process comprising polymerizing in the presence of a free-radical initiator, 100 parts by weight of (A) from about 55 to about 99.8% by weight styrene, (B) from about 0.2 to about 5% by weight of at least one isomer of methylstyrene selected from the group consisting of para-methylstyrene, ortho-methylstyrene and meta-methylstyrene, and (C) from 0 to about 40% by weight of an unsaturated dicarboxylic acid anhydride wherein the given percentages of (A), (B) and (C) are based on the combined weight of (A) plus (B) plus (C), in the presence of from about 1 to about 40 parts by weight of at least one rubbery polymer for each 100 parts of combined (A) plus (B) plus (C).

In a first embodiment of this invention, the polymeric molding composition does not comprise an unsaturated dicarboxylic acid anhydride and can be prepared by any of the known general techniques of polymerization suitable to produce high impact polystyrene (HIPS). Thus the polymeric molding composition can be prepared by the bulk polymerization, solution polymerization, and emulsion or suspension polymerization techniques by batch, continuous or intermittent addition of the monomers and other components. The polymerization reaction is carried out in the presence of at least one preformed rubbery polymer.

In a second embodiment of this invention, the polymeric molding composition comprises an unsaturated dicarboxylic acid anhydride and can be prepared by any of the known general techniques of polymerization suitable to produce non-equimolar copolymers of styrene with unsaturated dicarboxylic acid anhydrides such as, for example, non-equimolar styrene/maleic anhydride. Thus, the polymeric molding composition can be prepared by solution polymerization directly from the respective monomers by the incremental addition of the reactive monomer as taught in U.S. Pat. No. 2,971,939; by a continuous recycle polymerization process such as described in U.S. Pat. Nos. 2,769,804 and 2,989,517, or by the suspension polymerization process described in U.S. Pat. No. 3,509,110. The polymerization is carried out in the presence of at least one preformed rubbery polymer.

In the practice of this invention mixtures of methylstyrene rich in para-methylstyrene or meta-methylstyrene are suitable for use. A typical mixture employed in the examples contained about 95% by weight para-methylstyrene, about 5% by weight meta-methylstyrene and only a trace amount <0.1% by weight of ortho-methylstyrene.

Preferably, in accordance with this second embodiment, polymerization is accomplished by initiating polymerization of the mixture of monomers in the presence of at least one rubbery polymer by any suitable free radical initiator at from about 90° to about 150° C. via a continuous polymerization process.

In the method of this invention, it is believed that the methylstyrene functions to enhance the grafting efficiency between e.g. the styrene or styrene/maleic anhydride copolymer and the rubbery polymer. Accordingly, only minor amounts of methylstyrene are needed and as little as 0.2% by weight in a continous polymerization monomer feed is effective. On the other hand, increasing the amount of methylstyrene in the monomer feed to more than 5% by weight although possible, is not believed to be significantly more effective than minor amounts, for example, 2% by weight, and may result in undesirable cross-linking. The preferred amount of methylstyrene employed in the practice of this invention is dependent on the polymerization technique used and is that amount which is sufficient to get from about 0.5 to about 3 weight percent in the molding composition.

The conjugated diene monomers useful in the present invention include butadiene-1,3, isoprene, chloroprene, bromoprene, cyanoprene, 2,3-dimethyl-butadiene-1,3, and the like. The most preferred for the purpose of this invention are butadiene and isoprene because of their ready availability and copolymerization tendencies.

As used herein the term "rubbery polymers" is understood to mean all polymers which when employed in the molding compositions of this invention serve to enhance molded composition impact resistance. The rubbery polymers useful in this invention are homopolymers of the conjugated diene monomers mentioned above as well as copolymers of these dienes and another monomer component such as acrylonitrile, methacrylonitrile, styrene, alpha-methyl styrene, the vinyl toluenes, ethyl acrylate, the propyl acrylates, the butyl acrylates, butyl methacrylate, and mixtures thereof, wherein there is present in the polymer at least 50% by weight of polymerized diene monomer. If a mixture containing two or more rubbery copolymers is employed, at least one of the rubbery copolymers will contain at least 50% by weight of polymerized diene, the other copolymers can contain less than 50% by weight of polymerized diene.

A particularly suitable rubbery polymer is designated "Stereon" 720, commercially available from Firestone Synthetic Rubber & Latex Company. Stereon 720 is 90% by weight butadiene and 10% by weight styrene with about 55% by weight of the styrene appearing as polystyrene blocks.

If employed, the unsaturated dicarboxylic acid anhydride will be employed in an amount of from about 5 to 40% by weight of the total combined weight of (A)+(B)+(C). Maleic anhydride is preferred, but any of the homologues of maleic anhydride such as itaconic, citraconic and aconitic anhydrides can also be employed.

The novel polymeric molding compositions of the present invention are readily processed thermoplastic materials which can be thermoformed into a wide variety of useful articles in any of the conventional ways employed with known thermoplastic polymeric materials, such as by extrusion, milling, molding, drawing, blowing, etc. into pipes, strands, sheets, films, bottles and the like.

The following examples serve to further demonstrate the invention.

EXAMPLE I (PRIOR ART)

This example demonstrates the preparation of a rubber-modified styrene/maleic anhydride copolymer. No methylstyrene was employed. This example is included for comparative purposes.

The following monomer feed and initiator feed were continuously charged into the top of a 1-liter Zipperclave continuous stirred tank reactor at 110° C. under 90 psi.

| | Amount (g) |
|---|---|
| Monomer Feed | |
| Styrene | 2116.6 |
| Maleic Anhydride | 105.0 |
| Rubber (Stereon 720) | 225.0 |
| Phosphite (Polygard HR-Uniroyal) | 3.0 |
| Initiator Feed | |
| Styrene | 500.0 |
| Benzoyl Peroxide | 1.48 |

The resulting copolymer syrup was withdrawn continuously from the reactor bottom at a conversion of 45–50% by weight and was spread in a thin layer on an aluminum tray and heated in a vacuum oven at 100° C. for about 5 hours and then ground into a fine powder. The powder was then heated again in a vacuum oven at 110° C. for 2 hours.

The polymer powder was then extruded twice at 480° F. in a devolatilization extruder, pelletized and injection molded at 500° F.

The resulting molded product was found to contain in weight percent 6.5 maleic anhydride, about 14 Stereon 720 with the balance being styrene and was subjected to physical testing and the test results and other pertinent data are set forth below in Table I.

EXAMPLE II

This example demonstrates the preparation of a rubber-modified styrene/maleic anhydride/p-methyl styrene terpolymer of this invention using substantially the procedure of Example I. The only significant difference from Example I was that p-methylstyrene was added to the monomer feed:

| Monomer Feed | Amount (g) |
|---|---|
| Styrene | 2116.6 |
| Maleic Anhydride | 105.0 |
| p-methylstyrene | 53.4 |
| Rubber (Stereon 720) | 225.0 |
| Phosphite (Polygard HR) | 2.7 |

The resulting copolymer syrup was withdrawn continuously from the reactor bottom at a conversion of 45–50% by weight and was spread in a thin layer on an aluminum tray and heated in a vacuum oven at 100° C. for about 5 hours and then ground into a fine powder. The powder was then heated again in a vacuum oven at 110° C. for 2 hours.

The polymer powder was then extruded twice at 480° F. in a devolatilization extruder, pelletized and injection molded at 500° F.

The resulting molded product was found to contain in weight percent about 1–2 methylstyrene, 6.8 maleic anhydride about 14 Stereon 720 with the balance being styrene and was subjected to physical testing and the test results are set forth below in Table I.

EXAMPLE III

This example demonstrates the preparation of a rubber-modified styrene/maleic anhydride/p-methylstyrene terpolymer of this invention.

The following monomer feed and initiator feed were continuously charged into the top of a 1-liter Zipperclave continuous stirred tank reactor at 114°–116° C. under 50 psi.

| | Amount (g) |
|---|---|
| Monomer Feed | |
| Stereon 720 | 337.5 |
| Maleic anhydride | 108.0 |
| Styrene | 2003.4 |
| p-methylstyrene | 51.1 |
| Polygard HR | 2.7 |
| Initiator Feed | |
| Styrene | 500.0 |
| Benzoyl Peroxide | 1.48 |

The resulting copolymer syrup was withdrawn continuously from the reactor bottom at a conversion of 45–50% by weight and was spread in a thin layer on an aluminum tray and heated in a vacuum oven at 100° C. for about 5 hours and then ground into a fine powder.

The powder was then heated again in a vacuum oven at 110° C. for 2 hours.

The polymer powder was then extruded twice at 480° F. in a devolatilization extruder, pelletized and injection molded at 500° F.

The resulting molded product was found to contain in weight percent about 1-2 methylstyrene, 7.1 maleic anhydride, about 22 Stereon 720 with the balance being styrene and was subjected to physical testing and the test results are set forth below in Table I.

EXAMPLE IV

This example demonstrates the preparation of a rubber-modified styrene/maleic anhydride/p-methylstyrene terpolymer of this invention.

The following monomer feed and initiator feed were continuously charged into the top of a 1-liter Zipperclave continuous stirred tank reactor at 120°-125° C. under 90 psi.

|  | Amount (g) |
|---|---|
| Monomer Feed | |
| Stereon 720 | 225.0 |
| Maleic Anhydride | 105.0 |
| Styrene | 2,116.6 |
| p-methylstyrene | 53.4 |
| Polygard HR | 3.0 |
| Initiator Feed | |
| Styrene | 500.0 |
| Benzoyl Peroxide | 1.48 |

The resulting copolymer syrup was withdrawn continuously from the reactor bottom at a conversion of about 50% by weight and was spread in a thin layer on an aluminum tray and heated in a vacuum oven at 100° C. for about 5 hours and then ground into a fine powder. The powder was then heated again in a vacuum oven at 110° C. for 2 hours.

The polymer powder was then extruded twice at 480° F. in a devolatilization extruder, pelletized and injection molded at 500° F.

The resulting molded product was found to contain in weight percent about 1-2 methylstyrene, 7.0 maleic anhydride, about 15 Stereon 270, with the balance being styrene and was subjected to physical testing and the test results are set forth below in Table I.

TABLE I

|  | Example I (Prior Art) | Example II | Example III | Example IV |
|---|---|---|---|---|
|  |  | INVENTION | | |
| Molding composition | | | | |
| Methyl Styrene (wt %) | 0 | 1-2 | 1-2 | 1-2 |
| Maleic Anhydride (wt %) | 6.5 | 6.8 | 7.1 | 7.0 |
| Rubbery polymer "Stereon 720", (wt %) | 14 | 14 | 22 | 15 |
| Styrene (wt %) | | BALANCE | | |
| Physical Property Test | | | | |
| Gardner Falling Weight[1] (in-lbs) | 136 | 200 | — | — |
| Notched Izod[2] (ft-lbs/in) | 2.0 | 3.7 | 6.3 | 4.4 |
| Tensile Strength[3] (psi) | 5,500 | 5,300 | — | — |
| Flexural Modulus[4] (psi) | 334,000 | 318,000 | — | — |
| % Elongation[5] | 24.4 | 34.2 | — | — |
| DTUL[6] (°C.) | 91 | 91 | 81 | 94 |

[1] 1¼" diameter orifice, ½" diameter punch - ⅛" thick × 3" × 2½" test sample
[2] ASTM D-256-73 - ⅛" thick × 2½ × ½" test sample
[3] ASTM D-638-72 - mini tensile bar, Type L
[4] ASTM D-790-71 - ⅛" think × 2½" × ½" test sample
[5] ASTM D-638-72 - mini tensile bar, Type L
[6] ASTM D-648 @ 264 psi; unannealed - ⅛" thick × 5" × ½" test sample The above data illustrate that, quite surprisingly, the incorporation of minor amounts of methylstyrene serves to significantly increase the impact properties of the molded products of this invention as compared to molded products of the prior art. As can be seen a molded product produced according to this invention incorporating methylstyrene (Example II) was found to exhibit a 47% increase in Gardner Falling Weight impact strength and an 85% increase in Notched Izod impact strength, as compared to an identically prepared molded product which did not incorporate methylstyrene (Example I).

It will be evident from the foregoing that various modifications can be made to this invention. Such, however, are considered as being within the scope of the invention.

What is claimed is:

1. A polymeric molding composition resulting from the polymerization of 100 parts by weight of (A) from about 55 to about 99.8% by weight styrene, (B) from about 0.2 to about 5% or more by weight of at least one isomer of methylstyrene selected from the group consisting of para-methylstyrene, ortho-methylstyrene and meta methylstyrene, (C) from 5 to about 40% by weight of an unsaturated dicarboxylic acid anhydride, wherein the percentages of (A), (B) and (C) are based on the total combined weight of (A) plus (B) plus (C), in the presence of from about 1 to about 40 total parts by weight of at least one preformed rubbery polymer.

2. The polymeric molding composition of claim 1 in which (B) is present in an amount within the range of from about 0.5 to about 3% by weight.

3. The polymeric molding composition of claim 1 in which (B) is substantially para-methylstyrene and (C) is maleic anhydride.

4. The polymeric molding composition of claim 1 in which the preformed rubbery polymer is styrene-butadiene rubber.

5. A process comprising polymerizing in the presence of a free-radical initiator, 100 parts by weight of (A) from about 55 to about 99.8% by weight styrene, (B) from about 0.2 to about 5% by weight of an isomer of methylstyrene selected from the group consisting of para-methylstyrene ortho-methylstyrene and meta-methylstyrene, and (C) from 5 to about 40% by weight of an unsaturated dicarboxylic acid anhydride wherein the given percentages of (A), (B) and (C) are based on the combined weight of (A) plus (B) plus (C), in the presence of from about 1 to about 40 parts by weight of at least one preformed rubbery polymer.

6. The process of claim 5 in which (B) is substantially para-methylstyrene.

7. The process of claim 5 in which (C) is maleic anhydride.

8. The process of claim 5 in which the preformed rubbery polymer is styrene-butadiene rubber.

* * * * *